Oct. 4, 1938.   T. CHESTER   2,131,725
METHOD AND SYSTEM FOR TREATING AIR OR OTHER FLUIDS
Filed Oct. 4, 1932   4 Sheets-Sheet 1

INVENTOR
Thomas Chester
BY
his ATTORNEY

Oct. 4, 1938.    T. CHESTER    2,131,725
METHOD AND SYSTEM FOR TREATING AIR OR OTHER FLUIDS
Filed Oct. 4, 1932    4 Sheets-Sheet 2
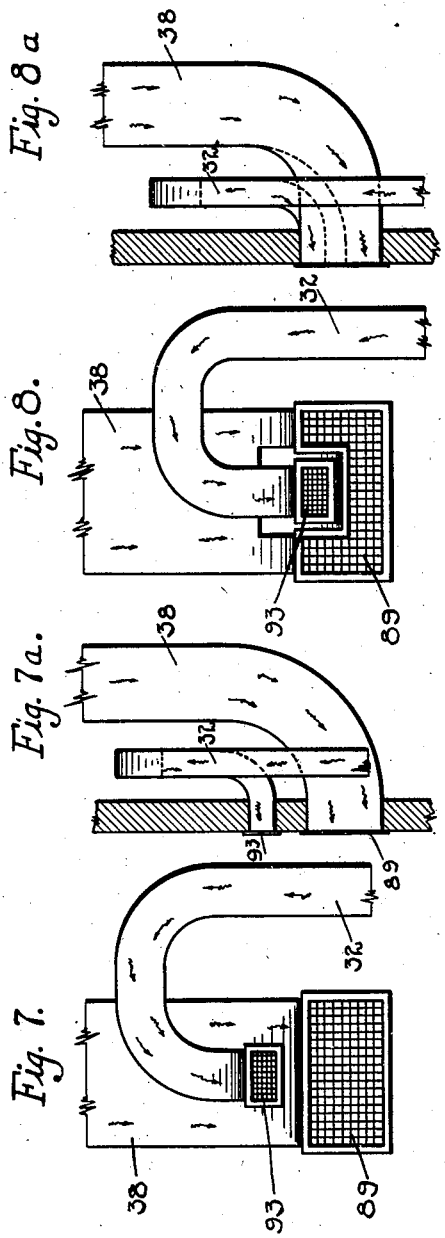
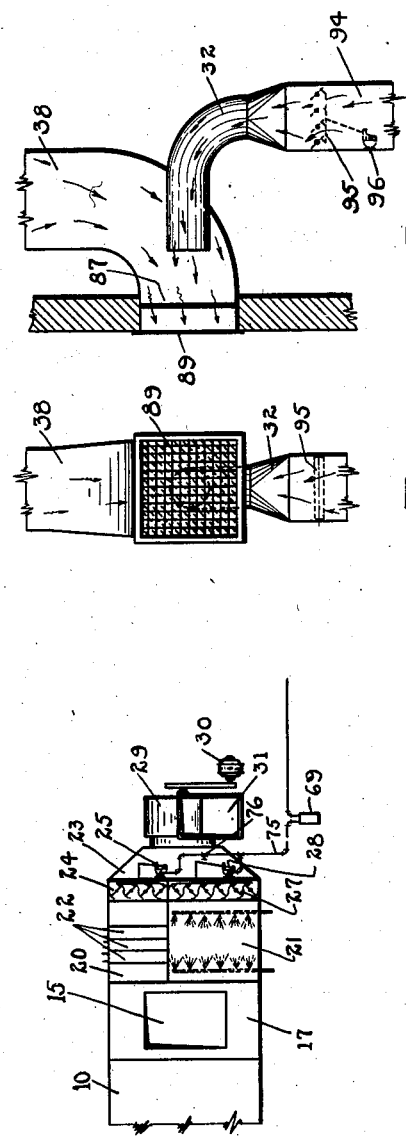
INVENTOR
Thomas Chester
BY
his ATTORNEY Oct. 4, 1938.   T. CHESTER   2,131,725
METHOD AND SYSTEM FOR TREATING AIR OR OTHER FLUIDS
Filed Oct. 4, 1932   4 Sheets-Sheet 3
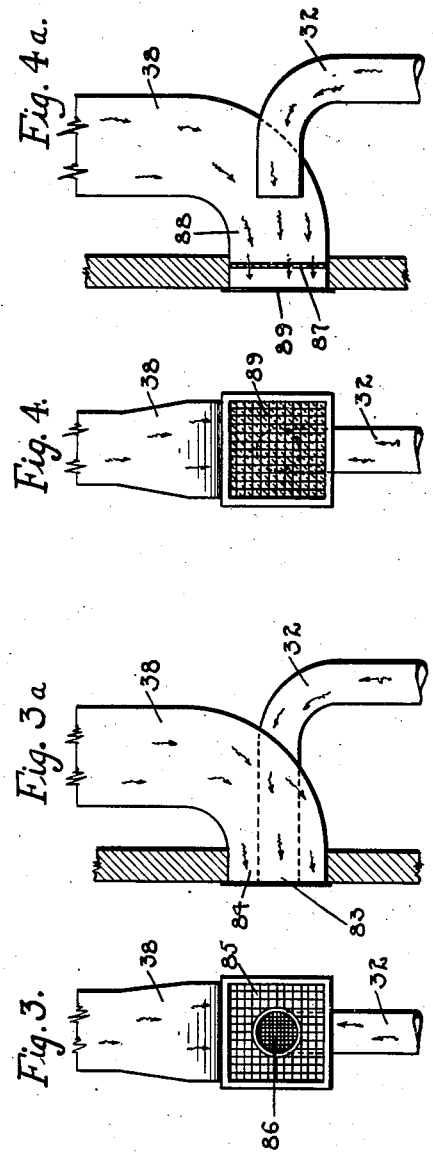
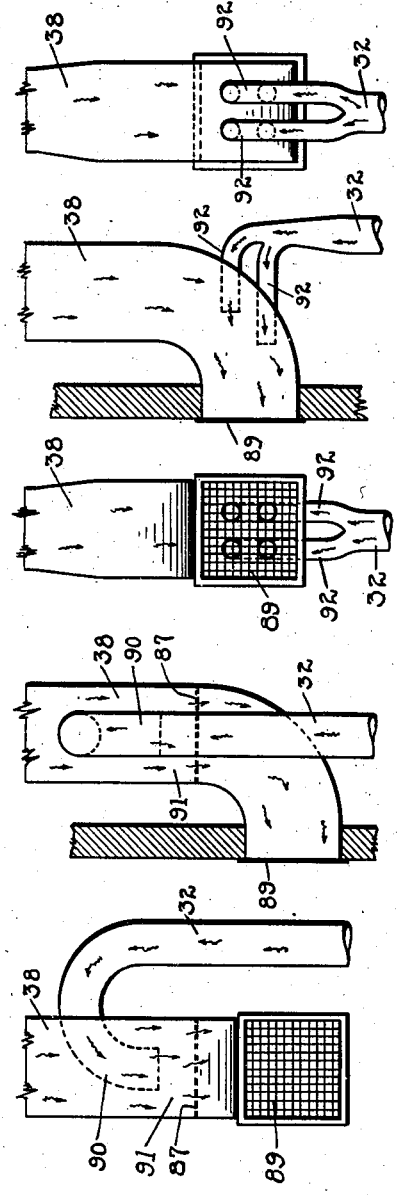
INVENTOR
Thomas Chester
BY
his ATTORNEY Oct. 4, 1938.  T. CHESTER  2,131,725
METHOD AND SYSTEM FOR TREATING AIR OR OTHER FLUIDS
Filed Oct. 4, 1932  4 Sheets-Sheet 4

INVENTOR
Thomas Chester
BY
his ATTORNEY

Patented Oct. 4, 1938

2,131,725

UNITED STATES PATENT OFFICE 2,131,725

METHOD AND SYSTEM FOR TREATING AIR OR OTHER FLUIDS

Thomas Chester, Detroit, Mich., assignor, by mesne assignments, to Auditorium Conditioning Corporation, New York, N. Y., a corporation of New Jersey Application October 4, 1932, Serial No. 636,157

3 Claims. (Cl. 98—39)

My invention relates to air conditioning and ventilating systems such as those employed for the purpose of artificially producing and maintaining suitable atmospheric conditions in rooms or enclosures occupied by people or where people assemble, such as theatres, churches, factories, stores and other buildings. More particularly this invention relates to a method of and apparatus for distributing suitably treated or conditioned air within an enclosure so as to expedite and facilitate mixing of the treated or conditioned air with the enclosure air and to reduce or substantially eliminate drafts of an objectionable nature due to low temperature.

In the ventilating of enclosures for human occupancy it is desirable to introduce adequate amounts of air taken from the outside atmosphere, for freshening the enclosure air by maintaining a relatively high free oxygen content and by diluting emanations from the occupants. Because of climatic variations it is desirable to heat and himidify the fresh air introduced in winter and to cool and dehumidify it in summer, in order to maintain indoor atmospheric conditions well suited to human comfort or to the requirements of various manufacturing processes. Also in order to maintain any required air temperature within an enclosure, heat must be supplied in winter to balance the escape of heat to the outside, and heat must be abstracted in summer to offset the inflow of heat from the outside. Various means and methods have been developed for providing conditioned air as desired by producing dry-bulb and wet-bulb inside air temperatures as required and coincidentally controlling the heat and moisture content of the air.

Whatever kind of dehumidifier is used for cooling and dehumidifying air for subsequent delivery to an enclosure, it is evident that the air delivered to the enclosure must be at a lower temperature than the average temperature maintained in the enclosure if any cooling of the air within the enclosure is to be accomplished.

The least expensive method of producing the required average atmospheric condition within the enclosure is to inject into it the smallest practicable quantity of conditioned air which will give the required cooling and dehumidifying effect. With this method the dehumidifier, ducts, and fan or fans will be of minimum sizes and minimum costs. Also the refrigerating machines will be of minimum capacities and costs because less heat abstraction is necessary for intensively dehumidifying the minimum amount of air, than is needed for condensing the same required amount of water vapor from a larger quantity or weight of air. This is due to the fact that the refrigerating effect is concentrated more on the removal of latent heat and less on the removal of sensible heat from the treated mixture of dry air and water vapor.

It is however undesirable to use this method, because the air injected into the enclosure would be at too low a temperature and would cause cold drafts, highly objectionable to the occupants, and conducive to colds and other ailments, with the cold air entering in fairly large streams through grilles and registers of the readily available conventional types.

In order to produce desirable atmospheric conditions economically within an enclosure, it has been the customary practice to treat recirculated air, i. e., air taken from and returned to the enclosure, or to treat air drawn from the outside atmosphere, i. e., external of the enclosure, or to treat a mixture of air taken both from within and without the enclosure in accordance with varying requirements governed principally by the total heat content of the outdoor air. This is old in the art and many installations were made before the beginning of the present century in which, owing to the necessity of handling sufficiently large volumes of air to carry the required heating effect, mixtures of fresh and recirculated air were heated and delivered to enclosures. By employing recirculated air the limitation in heating means such as steam temperatures and the economic impossibility of adding the necessary heat to air drawn entirely from the outside atmosphere with low prevailing outdoor temperatures was overcome. Also in processing lumber and other materials requiring high drying temperatures by means of heated air it has long been customary to largely recirculate the inside air and merely admit a relatively small amount of air from the outside for the purpose of causing a corresponding weight of hot air to be vented from the drying compartment or enclosure to the outside atmosphere and to carry with it the water vapor given off by the substance undergoing the drying process.

With the advent of artificial cooling of enclosures the existing practice of recirculating interior air was followed, as disclosed in 1907 in Patent No. 843,909, which shows means for producing a mixture of air drawn from both inside and outside an enclosure. As shown by this patent the air stream ahead of the cooling and dehumidifying means in the direction of flow could be drawn entirely from the outside atmosphere, entirely from the inside atmosphere, or could consist of any required mixture of air drawn from these two sources in accordance with the setting of certain adjustable dampers. The method disclosed by this patent in which there was, as above described, a mixing of two streams of air drawn from inside and outside an enclosure would permit the subsequent division of the confluent stream into two separate air streams, one of which could be caused to pass through a dehumidifier and the other of which could be caused to by-pass the dehumidifier, and this method has been found to be of great value in the art and represents the practice generally followed at present.

An improved means for producing the same result is disclosed in my Patent No. 1,791,751, of February 10th, 1931, in which the confluent stream supplied from the two sources mentioned is not divided, but is passed intact through a dehumidifier of novel construction equipped with means for producing dry and wet passages of variable cross sectional areas, with the result that air leaving the dehumidifier is not saturated as is the case when ordinary dehumidifiers are used, and with the result that the leaving air can be in the condition desired as regards dry-bulb and wet-bulb temperatures.

In the foregoing methods or systems disclosed by the prior art the chilled, saturated air which leaves the dehumidifier is preferably raised in temperature and lowered in relative humidity by blending the same with a secondary air stream composed entirely of return air taken from the room or enclosure, or by blending with a mixture of air from the enclosure and fresh air taken from the outside atmosphere. These methods necessarily involve imparting to the secondary air stream used for tempering purposes, the same force or pressure difference as compared with the prevailing atmospheric pressure, as that which is imparted to the primary air stream. In installations for cooling and dehumidifying the air supplied to enclosures it is usually necessary to impart to the fan impeller a peripheral speed sufficiently high to enable it to handle the required amount of air against maintained resistances equal to around 1½ inches water column, and in some cases as high as 2¼ inches water column, these pressures or partial rarefactions being necessary to overcome the resistances offered to the flow of the required amount of air by systems designed according to present methods.

This involves applying the same energy per cubic foot to the primary and secondary air streams and the equivalent orifice of the secondary stream has to be reduced sufficiently by means of dampers to make the resistance encountered by the secondary stream equal to the resistance offered to the flow of the primary air stream. Unless this is done the volume of the secondary air stream will be unduly augmented and the volume of the primary air stream will be correspondingly diminished, with the result that insufficient air will flow through the dehumidifier to enable the required amount of cooling and dehumidifying to be accomplished.

It is obvious that the chilled saturated air which leaves a dehumidifier and is subsequently delivered to an enclosure which is to be cooled and dehumidified, obtains whatever sensible and latent heat it receives from the enclosure, and that the final condition of the air which flows from the enclosure through the extraction openings for return to the conditioning apparatus is governed by the amounts of sensible heat and water vapor which are added to it in accordance with the sensible and latent heat loads of the enclosure.

The necessary cooling and dehumidifying is therefore quantitatively predicated upon the sensible and latent heat loads of the enclosure which is to be cooled and dehumidified, and this remains true regardless of the various methods which can be employed to transfer the sensible and latent heat loads of the enclosure to the air stream which is chilled and dehumidified within the dehumidifier.

About twenty years ago, a method was developed for delivering conditioned air to the dough rooms of bakeries and to rooms in which photographic films were dried whereby the air supply ducts were evenly perforated with multitudinous small circular openings, for the purpose of causing the conditioned air to pass into the room air in small streams, with consequent quick dissipation of the entering air currents, even diffusion of the entering air with the room air, and avoidance of drafts. By means of a modification of this method air can be injected into a room or enclosure through multitudinous openings about ½ inch diameter or through narrow slots placed in the ceiling with the air suplied from a plenum space above the ceiling, or from superimposed distributing ducts. With this second or modified method cold air at zero degrees Fahr. can be injected into a room without objectionable drafts being felt or perceived by the occupants. These methods however are objected to by designers, owners, tenants and occupants of buildings, because of the concomitant unsightly effect and the marring of decorations.

By my method the primary chilled and saturated air stream which has been suitably dehumidified may be tempered or blended within the room or enclosure with air which has been taken directly from the enclosure or if desired a partial and initial blending or tempering can be effected within the air supply passageways or ducts, preferably adjacent the discharge or outlet end thereof, the remainder of the tempering or blending action being accomplished subsequent to discharge from the ducts or passageways and within the room or enclosure. It is however desirable in some cases to return a certain amount of air from the enclosure to a chamber on the inlet side of the dehumidifier, i. e., ahead of the dehumidifier in the direction of air flow, there to be mixed with fresh air drawn from the outside atmosphere. This is sometimes desirable because a given occupied enclosure will have a definite maximum cooling and dehumidifying load in peak summer weather, and at such a time it is usually undesirable to take in more than 10 cu. ft. of outside air per minute per person within the occupied enclosure, because of the high heat and moisture content of the outdoor air. At such times whatever amount of air is needed to carry the required cooling and dehumidifying effect to the enclosure, is made up of the 10 cu. ft. of fresh air per minute per person plus whatever amount of recirculated air must be chilled and dehumidified to enable the occupied enclosure requirements to be met. Even in maximum summer weather however, the primary chilled and dehumidified air stream, which at such time is usually composed of a mixture of fresh and return air, will only amount to about one-third the magnitude, weight, and volume of the secondary stream of enclosure air which is used to expedite the mixing action of the combined primary and secondary streams with the enclosure air. It may also be noted, that the amount of air taken in from the outside atmosphere in summer should preferably be regulated by automatic means, responsive to the wet-bulb temperature of the outdoor air. It is further possible by my method to obtain a substantial saving in power consumption due to the fact that the primary and secondary air streams are handled by separate and independent fans or impelling means.

The invention consists in the novel method and the apparatus for carrying the same into effect, all of which will be more fully described hereinafter and the novelty of which will be particularly pointed out and distinctly claimed.

In the accompanying drawings, to be taken as a part of this specification, I have fully and clearly illustrated several embodiments of my invention by which my novel method may be carried into effect, in which drawings—

Fig. 2 is a detail view partly in section on the line 2—2 of Fig. 1;

Figs. 3 and 3a are detail views in front and side elevation, respectively, of the discharge ducts or passageways shown in Fig. 1;

Figs. 4 and 4a are detail views in front elevation and vertical section, respectively, showing another form of the discharge ducts;

Figs. 5 and 5a are detail views in front and side elevation, respectively, of another form of discharge ducts or passageways;

Figure 1:
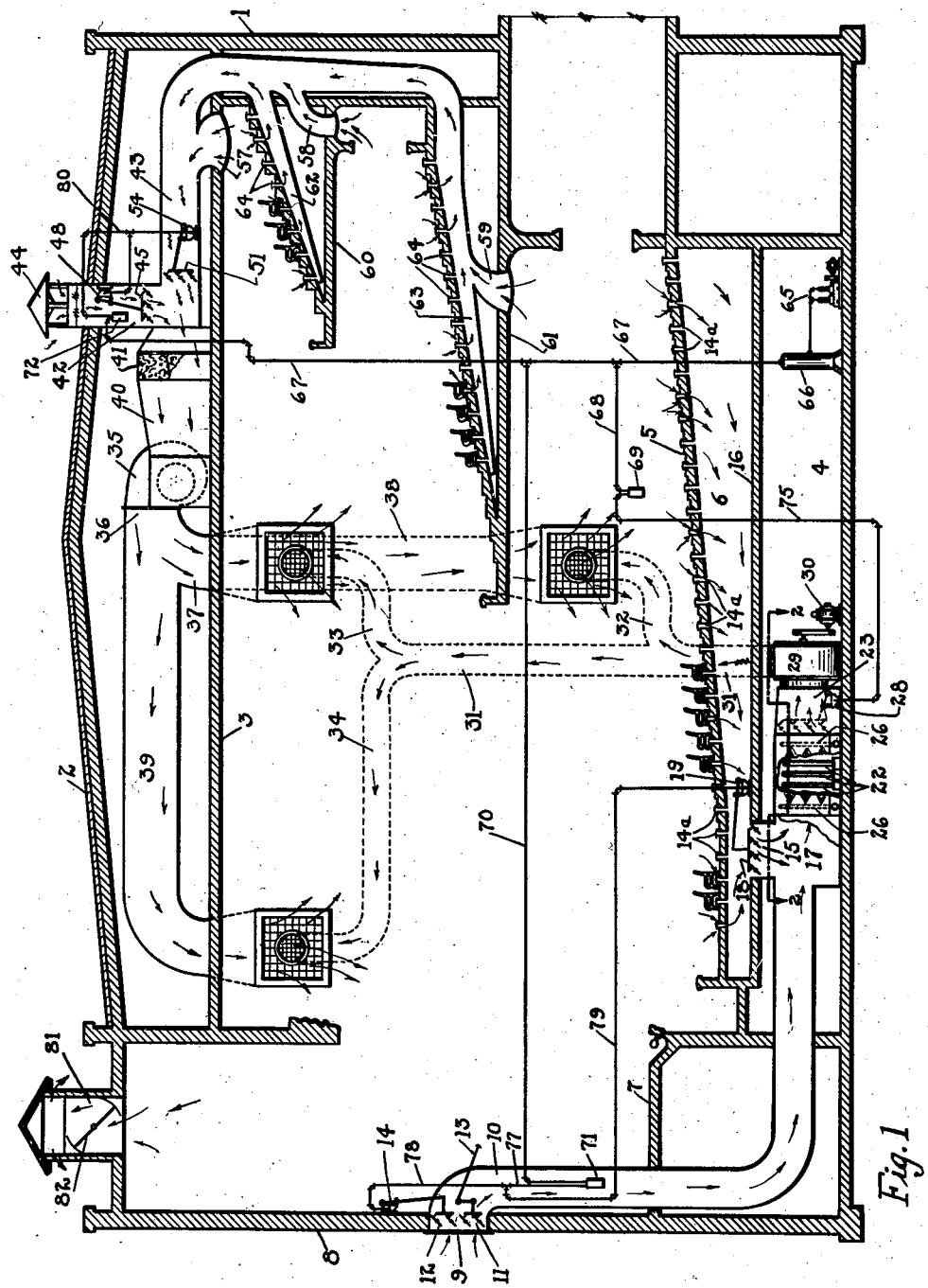
Figure 1 is a view in vertical section of a building, such as a theatre, illustrating diagrammatically an embodiment of the system of my invention in such a structure.
Figure 10:
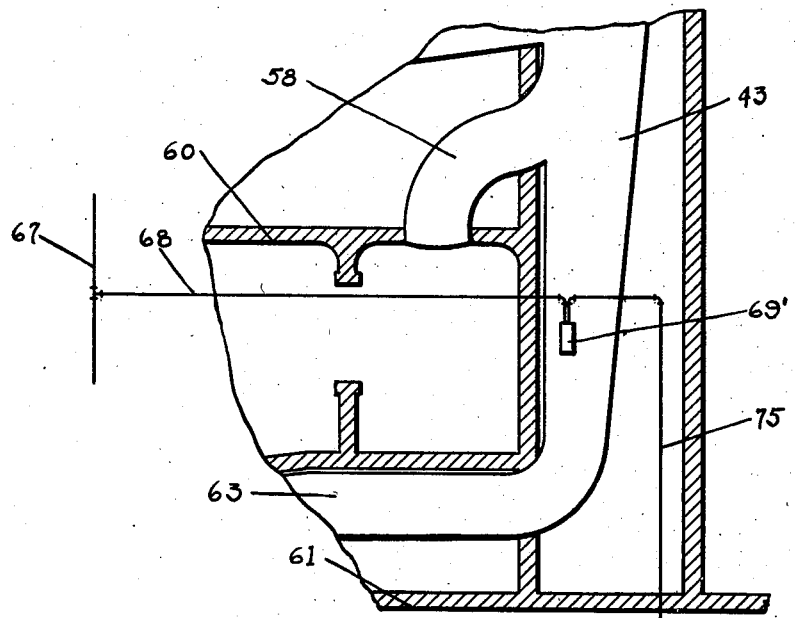
Figure 11:
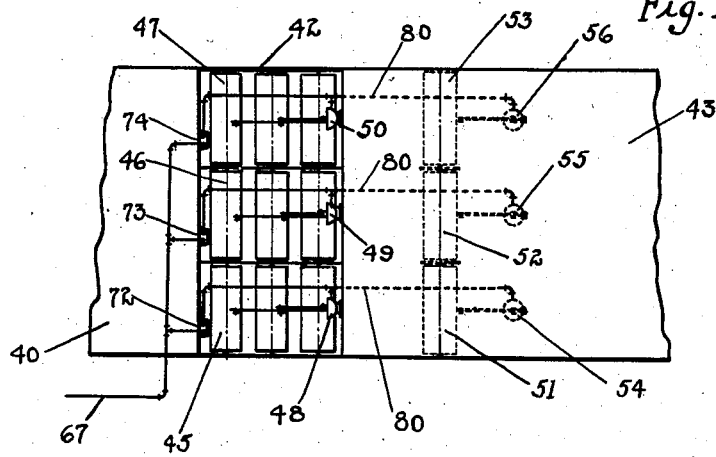

Figs. 6, 6a, and 6b are detail views in front, side, and rear elevation, respectively, showing another form of discharge ducts or passageways;

Figs. 7 and 7a are detail views in front and side elevation, respectively, showing another form of discharge passageways;

Figs. 8 and 8a are detail views in front and side elevation, respectively, showing another form of discharge passageways;

Figs. 9 and 9a are detail views similar to those of Figs. 4 and 4a but showing a modification in which a discharge or outlet control means is employed for the ducts;

Fig. 10 is a detail view showing a modification of the control means employed in Fig. 1, and Fig. 11 is a detail plan view, partly in section, showing certain fresh air and return air control means.

In the Figure 1, I have shown my system as applied to treatment of air in a theatre, but the type of building shown is purely illustrative for the purposes of describing my method and is not to be taken as limiting the use or application thereof to any particular type of building structure or other enclosure.

Referring to the drawings by characters of reference, I designates, generally, a building structure such as a theatre having a roof 2 and a suspended ceiling 3. The building has a basement 4 beneath the main floor or orchestra section 5 and between which is a space 6 providing an air flow duct or passageway for a purpose to be described. The stage is shown at 7, the building wall in rear of the stage, designated 8, preferably being provided with an air inlet port or aperture 9 through which air external of the room, theatre, or enclosure may be drawn from the outside atmosphere. The aperture 9 feeds into a duct or passageway 10 to which it is sealed, the duct leading downward into the basement 4 for supplying fresh outside air to certain air conditioning means to be described hereinafter. It may be noted that the position of the aperture 9 need not be through the exterior building wall in rear of the stage but may be located at any convenient point in any external wall. The effective area of the aperture 9 is controlled by adjustable dampers 11 and 12, respectively, which may be of any well known form or construction, by which the effective area of the inlet may be controlled. The dampers 11 and 12 may each comprise one or more louvres, the damper 11 preferably controlling a small fractional part of the cross sectional area of the aperture 9 and preferably being located in superposed relation. The damper 11 is preferably manually controlled by a hand lever, or the like, 13. The damper 12 is automatically controlled or regulated by power means 14, which may be energized by air under pressure as will be described hereinafter.

The duct or passageway 6 beneath the main floor is supplied with air through ports or passageways 14a opening through the floor 5, the passageways preferably opening through mushrooms, or the like, positioned beneath the orchestra seats, although the air supplied to the duct 6 may be vented thereinto by passages leading from the orchestra level within the theatre and through the side walls of the theatre. The air supplied or fed into the duct 6 discharges therefrom through a port 15 in the ceiling 16 of the cellar 4. The port 15 is connected by a passageway or conduit to a mixing chamber 17 which is also connected to the discharge or outlet end of the duct 10 so that air from the ducts 6 and 10 mixes within the chamber 17. The port 15 is provided with a damper 18 for controlling or regulating the passage of air from the duct 6 into the chamber 17, this damper 18 preferably being automatically operated by a power element 19.

The chamber 17 discharges into ducts or passageways 20 and 21 which are preferably positioned side by side and in line with the discharge end of the duct 10, see Fig. 2. The passageway 20 is provided with air heating means 22 such as radiators, or the like, which may be of any desired form or construction and may be heated electrically or by steam or hot water. The outlet from the passageway 20 opens into duct 23 and is controlled by an adjustable damper or louvre members 24. This damper is automatically operated by a power means 25. The passageway 21 comprises a dehumidifier and has suitable water spray pipes 26 therein which may be fed with water from any suitable source. The dehumidifier or dehumidifying means may be of any well known type on the market which will effectively dehumidify the air passing through duct 21. The duct 21 also discharges into the duct 23 and has its outlet controlled by a damper or louvre members 27 which are preferably automatically operated by a power means 28. It may be noted that the operation of the dampers 24 and 27 is inverse, i. e., the damper 27 opens as the damper 24 closes, and vice versa. The duct 23 is connected to the inlet side of a fan or other impelling means 29 which may be driven through suitable gearing by a motor, or the like, 30. The fan 29 discharges into a main duct or passageway 31 which may have one or more branch ducts 32, 33 and 34 for supplying air to outlet grilles, or the like, which open into the theatre or other enclosure.

In the space between the roof and the suspended ceiling 3 there is a fan or other air impelling means 35 which discharges into a main duct 36 having branch ducts or passageways 37, 38 and 39. These branch ducts preferably extend through the space above the ceiling 3 and thence downwardly through the theatre side walls to the desired discharge points where they open through ports or outlets into the theatre or enclosure as will be described hereinafter. The fan 35 may be driven by any suitable means such as an electric motor, or the like, and has its inlet connected to a duct or passageway 40 positioned above the ceiling 3. Within the duct 40 there is preferably a filter chamber, or the like, 41, for removing foreign particles from the air supplied to the fan. The duct 40, anterior to the filter means 41, is connected to branch ducts or passageways 42 and 43. The duct 42 preferably extends upwardly and opens through the roof 2 to the outside atmosphere and may be provided with a hood or cap member 44 which will prevent ingress of rain, snow, etc., into the duct 42, while permitting the free admission of air thereto. In this duct 42 is a plurality of damper means, preferably three in number, 45, 46 and 47, each of which may comprise a plurality of louvre members. These dampers 45 are separately controlled by power elements 48, 49 and 50, respectively. Each of the dampers preferably controls substantially one-third of the effective cross sectional area of the duct 42 and are operated in sequence such that one of the dampers is completely closed or opened before another of the dampers begins to move. This may readily be accomplished by adjustment of the power means, 48, 49 or 50, the order of operation of the dampers being immaterial. The duct 43 is also provided with control means such as dampers, preferably three in number, designated 51, 52 and 53, each of which preferably controls one-third of the effective cross sectional area of the duct 43. These dampers in duct 43 are operated by power means 54, 55, 56, respectively, which are adjusted to cause their dampers to close or open in sequence. The dampers in the duct 42 and in the duct 43 are preferably located adjacent the juncture of these ducts with the portions of the ducts 42 and 43 posterior to the dampers, defining with the duct 40 a mixing chamber. The duct 43 is provided with a plurality of branch ducts or passageways 57, 58 and 59, which open downwardly through the ceiling 3 and the ceiling portions 60 and 61 formed by the under side or wall of the theatre balconies. The main duct 43 is also supplied with return air from chambers 62 and 63 positioned beneath the balcony floors and receiving air through ports or passageways 64 in the balcony floors which may open beneath the seats and which may be provided with mushroom covers, or the like.

Positioned in the basement 4 is an air compression apparatus 65 which may include a compressed air storage tank 66. A pipe or conduit 67 extends from this tank and has a branch conduit or pipe 68 which leads to a control means 69, preferably positioned within the enclosure or theatre at the orchestra level. The pipe 67 has another branch pipe or conduit 70 which extends through the wall of the duct 10 and terminates at a control means 71 positioned therein. The pipe 67 extends upwardly above the ceiling 3 and is there branched to connect with the control means 72, 73 and 74 which are independent of each other and for a purpose to be described. Each of these control means is preferably a humidity regulator or a wet-bulb thermostat, although a dry-bulb thermostat may be used. The control means 69 is connected by suitable piping 75 to the power means 28 and 25. In the pipe 75 there is a valve or other control means 76, preferably manually operable, by which the power means 25 may be rendered ineffective to operate the damper 24. The control means 71 is provided with a pipe or conduit 77 from which lead branches 78 and 79 joined or connected respectively to the power means 14 and 19. The control means 72, 73 and 74 are each connected to their respective pairs of power means 48 and 54, 49 and 55, and 50 and 56 by pipes or conduits 80. This system of damper control or operation may be such as that known as the Powers system made by the Powers Regulator Company of Chicago, Illinois, or may be that known as the Johnson system made by the Johnson Service Company of Milwaukee, Wisconsin, or may be any other system in which air under pressure is permitted to flow to or is cut off from flow to the power means by the control means. It is, however, to be noted that this system is merely illustrative and other systems such as those operating by electricity could also be employed.

An exhaust outlet 81 may be provided, preferably through the roof 2, for permitting discharge of heated air which may pocket above the stage. This outlet is controlled by a damper, or the like, 82, which may be manually controlled, the damper being set in a position which will not interfere with normal operation of my system.

The ducts or passageways 32 and 38 which may be referred to as primary and secondary air ducts, respectively, open at their outlet ends into the interior of the enclosure or theatre and preferably through a side wall thereof, see Figs. 1, 3 and 3a. The duct 32 is preferably somewhat smaller in cross sectional area than the duct 38 and may be in the neighborhood of one-third the cross sectional area thereof. This duct 32 extends through a wall of the duct 38 adjacent the discharge end or outlet 83 thereof and preferably has its outlet or discharge end 84 positioned concentrically within the outlet 83 so that the primary air stream discharged from the duct 32 is surrounded substantially equally at all points by the secondary air stream issuing or discharging from the secondary air duct 38. These ducts 83 and 84 preferably terminate in a common vertical plane and in the plane of the inside face of the theatre wall.

The openings in the wall formed by the ducts 32 and 38 may be provided with grilles or screens 85 and 86 which may be of such form as to create turbulence of the discharging air streams or may be merely a means of improving the appearance of the outlet without having any effect on the direction of air flow. It may be noted that the size of the mesh or apertures through the screens 85 and 86 may be the same if so desired.

In Figs. 4 and 4a, the duct 38 which terminates in the plane of the inside face of the theatre wall is provided with an obstruction or baffling means 87 which acts to create turbulent flow of the air which passes therethrough. The means 87 may be in the form of a perforate plate, for example, and defines the discharge side of a mixing chamber 88 within the duct 38. The conduit or duct 32 extends through a wall of the duct 38 and terminates therein anterior to the baffling means 87, such that it discharges into the chamber 88. The duct 38 may be provided with a grille or screen 89 similar to that provided for the ducts in the form shown in Fig. 3.

In Figs. 5 and 5a, the duct 38 is also provided with the obstruction or baffling means 87 and with the grille 89. The conduit 32 in this form extends through a side wall of the duct 38 and is turned or bent downward, as at 90, within the duct 38. The space between the outlet of the portion 90 and the baffling means 87 defines a mixing chamber 91.

In the form shown in Figs. 6, 6a and 6b, the duct 38 terminates as in the other forms in the plane of the inside face of the theatre wall and is provided with a grille, or the like, 89. In this form the duct 32 terminates in a plurality of branch ducts 92 which extend through a wall of the duct 38 and terminate therein short of the outlet end of the duct 38. The branch ducts 92 are preferably equally spaced vertically and horizontally, the upper branch ducts terminating short of the discharge ends of the lower ducts 92 so that the primary air stream supplied through duct 32 will be subdivided by the branch ducts 92 and cause turbulent flow within the discharge end of the secondary air duct 38. I have shown the duct 32 divided into four branch ducts but this is merely illustrative and is not to be taken as a limitation of the number of branch ducts 92 which may be employed.

In Figs. 7 and 7a, the primary duct 32 opens through the theatre wall in spaced relation to the secondary air duct 38 and preferably above the same midway between the side or end edges thereof. The primary duct is provided with a grille 93 similar to the grille 89 provided for the duct 38.

Figs. 8 and 8a show a construction similar to that of Fig. 7 but in this form the secondary air duct 38 has a substantially U-shaped terminal end where it passes through the theatre wall. This form of duct provides a substantially upwardly open channel which receives the primary air duct 32, preferably having the upper edge or wall of its opening in the plane of the uppermost portion of the duct 38 where the duct opens through the theatre wall. The ducts 32 and 38 are provided with grilles, or the like, 93 and 89, respectively, as in Fig. 7.

Any of the foregoing forms shown in Figs. 3 to 8, inclusive, may be provided with individual damper control means as shown in Figs. 9 and 9a, which is illustrative of such a damper means applied to the form of Figs. 4, 4a. The primary air duct 32 is provided with a portion 94, preferably of rectangular cross section, to receive the damper means 95 which preferably comprises a plurality of pivoted louvre members linked together and operable by a motor or other power means 96 similar to those employed in the construction of Fig. 1. This motor 96 is operatively connected to a control means which is preferably a humidity regulator or wet-bulb thermostat but may be a dry-bulb thermostat if desired and which is preferably positioned in the region supplied with conditioned air from the ducts 32 and 38. It may be noted that in a system such as that shown in Fig. 1 the damper means 95 would preferably be positioned in the branch duct 31 between the branch 32 and the branches 33, 34 so that the damper means would control discharge of primary air simultaneously from ducts 33 and 34. With the damper means 95 so positioned the humidity regulator, or the like, would be positioned in the region of the balconies and preferably near one of the return air outlets as 57 or 58 so that the regulator would be accurately responsive to the condition of the atmosphere in the balcony or gallery region. A second damper means 95 would be positioned in the branch duct 32 to control the discharge of primary air therefrom and this damper means would be regulated by a control means preferably situated adjacent the return air duct 59. I have not shown the location of the control means for the damper means 95 as it is believed that the same will be obvious in the foregoing description and the disclosure of Fig. 1.

In Fig. 10 the control means 69, here designated 69', is shown positioned in the return air duct 43 which supplies the fan 35. By so positioning the control means 69' it is more sensitive to the condition of the atmosphere within the theatre as it is in the direct path of flow of the air drawn from the interior of the theatre or enclosure.

In carrying out the method as formed by my apparatus as above described, the manually operable damper 11 will be set so as to permit the intake of some suitable minimum amount of fresh air, such as 10 cu. ft. per minute per person, to the interior of the theatre or enclosure in summer weather when the outside wet-bulb temperature is at the average summer maximum temperature for the particular locality where the enclosure or theatre is situated. The damper 11 will therefore be set in various positions in accordance with the number of persons within the theatre or enclosure which may be taken care of by the attendant of the apparatus. The dampers 12 and 18, as above defined, operate inversely, the damper 12 controlling that portion of the inlet 9 which is not controlled by the damper 11. The motors or power means 14 and 19 are preferably adjusted so that when the outside wet-bulb temperature is at the average maximum summer temperature, say for example 75 degrees wet-bulb Fahr., for the locality where the enclosure or theatre is situated, the control means 71 will have energized the means 14 to move the damper 12 to full-closed position and will have energized the means 19 to move the damper 18 to full-opened position. When the outside wet-bulb temperature is at some selected point such as, for example, 60 degrees Fahr., or some other selected temperature below 60 degrees Fahr., the control means 71 functions to energize the power means 14 to move the damper 12 to full-opened position and energizes the power means 19 to move the damper means 18 to full-closed position. Between these limits at which the dampers are in full-opened or full-closed positions the control means 71 will act to regulate the positions of the dampers 12 and 18 so that they will have positions between full-opened and full-closed position, depending upon the wet-bulb temperature. The control means 69 is set to automatically maintain the air within the enclosure or theatre at some desired relative humidity—say 50%, for example. If the relative humidity varies above or below this desired point, the control means 69 will energize or de-energize the power means 28 so as to decrease or increase the volume of air flow through the dehumidifying means. Generally in summer weather and at such times or periods when it is unnecessary to heat the primary air stream supplied through duct 31, the damper 24 is closed and maintained closed by cutting off compressed air flow to the power means 25 at the control valve 76. Of course, when the temperature of the air supplied through the primary duct 31 is below that desired, the valve 76 will be manually opened to permit air flow over the heating means 22 whenever the control means 69 causes the motor 25 to actuate the damper 24. The power means 48, 49 and 50, controlling the fresh air inlet 42, are set so that the sequentially operating dampers will each be in full-opened position when the outside atmosphere is in a state well suited to human comfort, the control means 72, 73 and 74 each having responded to the wet-bulb temperature for which it was set. When the control means 72, 73 and 74 have so responded, compressed air will also be admitted thereby to the power means 54, 55 and 56 so that the dampers 51, 52 and 53 will have been moved to full-closed position by their power means. As the wet-bulb temperature of the outside atmosphere varies from the ideal condition, the dampers 45, 46 and 47 will be sequentially closed and the dampers 51, 52 and 53 will be sequentially opened as the control means 72, 73 and 74 respond to the changing condition of the atmosphere. Excess air supplied to the interior of the room or enclosure from the fresh air inlets 9 and 42 will escape through the theatre entrances and exits and also through the vent 81, some of this excess air also being vented to atmosphere through the usual toilet or smoking room exhausts or ventilators.

When the controls have been adjusted or set as above described, the fans 29 and 35 may be placed in operation. Air will now be drawn by the fan 29 through the port 9 from the outside atmosphere, the quantity of air being controlled by wet-bulb temperature acting through the control means 71 to supply or exhaust compressed air to or from the power means 14. The volume of fresh air passing the automatically controlled damper 12 and the manually adjusted damper 11 will be fed by duct 10 to the mixing chamber 17 where this fresh air will be mixed with varying quantities of air from the duct or compartment 6, depending upon the position of the damper means 18, which as above noted is actuated inversely or complementally to the damper 12. This mixture of fresh air from duct 10 and return air or air from within the room or enclosure supplied through duct 6 and port 15 defines the primary air stream which may be subdivided in accordance with the positions of the damper means 24 and 27. As noted above, the subdivision of the stream will not be effective in summer weather due to the maintenance of the damper means 24 in closed position. However, during such times as it is desired to heat the primary air stream, whether it be actually within that period known as summer or not, the dampers 24 and 27 which act inversely or complementally to one another will permit more or less air to pass through the passages 20 and 21 in accordance with the wet-bulb temperature within the theatre or enclosure and effecting the control means 69. The portions of the subdivided primary stream passing through the passageways 20 and 21 will be reunited in the outlet duct 23. The dehumidified heated or treated and conditioned air passes from the duct 23 to the rotary fan or impelling means 29 and is discharged therefrom into the main duct 31 from which it passes to the branch ducts 32, 33 and 34.

At this point, it may be noted that the air leaving the dehumidifier may be automatically maintained at a substantially constant temperature by means, for example, of a dew-point thermostat which may be operatively connected to a control means, not shown, for varying the temperature of the spray water supplied to the dehumidifier through the pipes or conduits 26 so as to make provision for variation in the air heat loads. If desired, the temperature of the saturated air leaving the dehumidifier may be controlled or varied as required by means of a gradually acting thermostat which may be placed in the path of the saturated air leaving the dehumidifier. This thermostat can be calibrated and can then be adjusted by hand according to the outdoor weather conditions or according to the number of persons within the ventilated enclosure so as to provide saturated air at the desired temperature. I have not considered it necessary to show the foregoing apparatus for controlling or maintaining constant the temperature of the saturated air as the same is well known in the art and is not a part of this invention.

The fan 35 is positioned within the secondary air duct or passageway and receives air which has been cleaned or filtered by the means 41 and which is supplied either from the fresh air inlet duct or passageway 42 or from the return air duct or passageway 43 or from these two ducts or passageways simultaneously. When the outside atmosphere is substantially in an ideal condition or a condition which is well suited to provide for human comfort within the enclosure or theatre, the dampers 45, 46 and 47 will each be in full-opened position and the dampers 51, 52 and 53 will be in full-closed position so that the fan 35 will receive fresh air alone from the passageway 42. Should the condition of the outside atmosphere vary and become dry or humid, or too hot or too cold, the dampers 45, 46 and 47 will be sequentially closed in proportion to the variation from the ideal condition of atmosphere and simultaneously with change in the effective flow area of the inlet passage 42, the dampers 51, 52 and 53 will be sequentially opened, the action of the two sets of dampers being complemental or in inverse operation. As the dampers 51, 52 and 53 are moved toward open position, air will be drawn through the duct 43 from the return air inlets 57, 58 and 59 and also from the branch ducts or passageways 62 and 63 supplied from mushrooms beneath the gallery or balcony seats. This secondary air which is discharged from the fan 35 is fed into the duct or passageway 36 from which extend branch ducts 37, 38 and 39. It may be noted that these branch ducts which terminate adjacent the terminal ends of the primary branch ducts 32, 33 and 34, as hereinbefore described, preferably have their co-operating terminal end portions located to discharge through ceiling or soffit apertures in a downward direction although they may discharge laterally, as shown in Fig. 1.

As the action which takes place between the discharged primary and secondary air streams is the same for each of the branch ducts, a description directed to the branch ducts 32 and 38, for example, will suffice for a description of the other branch duct outlets. In the forms shown in Figs. 1 and 3, the primary air will be at a lower temperature and at a less absolute humidity compared to outside atmosphere than the secondary air when the apparatus is employed in summer weather. The primary air is here discharged from the duct 32 within an envelope of surrounding warmer secondary air from the duct 38. The discharging streams of air at different relative sensible heats pass into the room or enclosure and as the streams penetrate the atmosphere of the enclosure or room, the primary or inner air stream will diffuse into the under-lying portion of the secondary air stream. This blending of the streams makes it possible to discharge the relatively cold dehumidified air directly into the room or enclosure without creating objectionable drafts and without danger of subjecting the occupants of the room or enclosure to direct contact by the cold air stream. It may also be noted that the mixing or blending of the streams occurs throughout the entire depth of penetration of the streams.

The foregoing description of the blending of the streams in Figs. 1 and 3 is substantially the same as that which occurs in the forms shown in Figs. 7 and 8. In these two further forms there is provided a blanket or layer of relatively warmer secondary air in a substantially horizontal plane beneath the plane into which the primary dehumidified air stream is discharged. In these forms there will also therefor be a blending of the streams by diffusion of the primary stream within the secondary stream. Fig. 8 shows the primary stream surrounded on three sides so that the primary stream is confined effectively within the warmer secondary stream.

The forms shown in Figs. 4, 5, 6 and 9 have a further advantage over the forms shown in Figs. 1, 3, 7 and 8 in that they are particularly adapted for a substantially vertical discharge of the air streams. This follows from the fact that the primary air stream discharges in Figs. 4, 5 and 9 into a preliminary mixing chamber or compartment, preferably within and formed by the terminal end portion of the secondary air passageway. The outlet from this chamber and from the secondary air duct is obstructed by the baffling means 87 so that the primary air stream creates turbulence as it discharges into the secondary air stream, the baffling means further increasing the swirling and the wiping contact between the streams. Therefore, in these forms the air discharged into the room or enclosure will have turbulence, with the remainder of the blending or mixing between the streams occurring within the room or enclosure due not only to the turbulence but also to gravitation of the colder primary air stream, as described above with respect to Figs. 1, 3, 7 and 8. In the form shown in Fig. 6 the mixing chamber is not provided with any obstruction which defines its outlet but is the entire terminal end portion of the duct 38, the turbulence being created by the discharge of primary air through a plurality of separate spaced jets or branch ducts 92 into the secondary air. In this form, Fig. 6, there will be partial mixing, both within the duct 38 and also within the room or enclosure.

The operation of the apparatus shown in Figs. 9 and 9a, it is believed will be obvious from the foregoing description of operation of the other forms and the prior description of the structure of Figs. 9 and 9a. However, it may be noted that the control means 69 or 69' will compensate for any increase in cooling effect from the primary branch ducts which are not shut off upon closing any of the other primary branch ducts so that over-cooling of any region of the room or theatre will not occur. This control of particular zones or regions within the room or enclosure is particularly suited to enclosures such as theatres in which there are balconies or galleries such that there are different strata or zones within which the atmosphere should be regulated. Thus, it is possible with this zone control of Figs. 9 and 9a to increase the efficiency of the system by automatically regulating the discharge of conditioned cooled air in accordance with numerical change in persons within the room or space and also in accordance with variation in the sensible heat load due to the position of the sun or variable wind action upon the different external walls of the theatre or other enclosure.

The operation of the dampers controlling the air ducts 42 and 43 has been described as automatic but I wish it to be understood that these ducts or passageways may preferably be under manual control of the attendant in charge of the apparatus. The change required to make these control means manual as distinguished from automatic may be accomplished by providing hand-operated valves, or the like, in place of the control means 72, 73 and 74, which valves may be positioned at any convenient point of operation such as in the office of the attendant, the necessary piping being employed. By controlling the ducts 42 and 43 manually, it is possible to overcome the danger of supplying air which is too cold through the secondary air ducts. Such a possibility would occur, for example, on a rainy day when the wet-bulb temperature might be, say, at 60 degrees Fahr., and due to the saturation of the atmosphere the dry-bulb temperature would be approximately 60 degrees Fahr., so that the fresh air admitted through the open passageway 42 would be too cold for human comfort.

Irrespective of what the velocities of discharge may be from the primary and secondary air ducts, it is normally desirable to maintain the velocities substantially equal to each other but it is to be noted that the mixing or blending of the streams may be enhanced by increasing the velocity of the secondary air stream above the velocity of the primary air stream. This difference in relative velocities will improve the rubbing contact between the streams, thereby setting up turbulence in their planes of contact and will further result in the secondary stream carrying the tempered primary stream deeper into the atmosphere of the enclosure or room. The blending or mixing of the air will also be accelerated by a difference of primary and secondary air velocities when employed with the forms shown in Figs. 4, 5, 6 and 9 as the primary and secondary air streams will strike the obstruction or baffling means at different velocities so that the air within the mixing chamber 88 will be more vigorously churned up.

By the use of my method, it is possible to condition the air or atmosphere within a room or other enclosure more efficiently than was hitherto possible and at a very marked saving in energy consumption which necessarily results in a low cost of operation. For example, by my method I may employ a #9 single inlet American "Sirocco" fan for handling the primary air stream in the position of fan 29. Such a fan could be used to handle 35,000 cubic feet of air per minute against a maintained resistance of 1½ inches water gauge when operating at 255 revolutions per minute, the brake horsepower required by such a fan being 16.5. The fan 35 might be a #19 single inlet American "Sirocco" fan which is capable of handling 105,000 cubic feet of air per minute against a maintained resistance of ½ inch water gauge when operating at 73 revolutions per minute, the brake horsepower consumed by such a fan being 17.9. These fans would be capable of supplying a total of 140,000 cubic feet per minute of mixed, fresh, dehumidified air and return air which would be the proper volume of air to supply a theatre, or the like, having a seating capacity of 5000. In accordance with the present methods, such a theatre would be supplied with about 35,000 cubic feet of air per minute taken in from the outside atmosphere at, say, a wet-bulb temperature of 78 degrees Fahr. This outside air would then be cooled during passage through the dehumidifying means to about 45 degrees dewpoint, and this saturated primary stream of air would be subsequently mixed with about 105,000 cubic feet of air per minute taken from inside the theatre, i. e., return or secondary air. Prior to my invention, the total volume of air supplied to such a theatre, namely 140,000 cubic feet per minute, would normally be supplied by a single fan. A fan to handle this volume of air per minute might be a #18 single inlet American "Sirocco" fan which is capable of handling 140,-000 cubic feet of air per minute against a maintained resistance of 1½ inches water gauge when operating at 128 revolutions per minute, the fan consuming substantially 65 brake horsepower. From the foregoing it is at once obvious that by my system the total power consumption would be in the neighborhood of, say, 34.4 brake horsepower as compared with 65 brake horsepower when all the air supplied to the theatre is handled by a single fan. In other words, for the particular example given above my novel system provides a saving in power of substantially 47% and this percentage would be substantially maintained for theatres of other capacities. The foregoing example is not to be construed as limiting the scope of my invention but has merely been set forth as a concrete example of the efficiency and saving which may be effected by the use of my system and as illustrative of specifications which might be followed in commercial practice.

Although I have described my system as one for cooling and ventilating a theatre, room or other enclosure, I desire it to be understood that my system and the method of its operation are equally adapted for heating and himidifying a room or other enclosure. When so employed, the primary air stream would be at a higher sensible heat than the secondary air stream and would preferably be heated to an extremely high temperature. This might be accomplished, for example, by employing a heating medium for the air such, for example, as diphenol, or the like. In operation, the intermingling or blending of the air streams would be as described hereinbefore, the primary stream diffusing into the secondary air stream during the penetration of the streams into the atmosphere of the room or other enclosure so that the high temperature primary air would be tempered by the secondary air stream. When so employed, the forms of discharge outlets shown in Figs. 7 and 8 would obviously be inverted from the positions shown in Figs. 7 and 8 so that the primary highly heated air stream would discharge in a plane below the plane of the tempered or cooled secondary air stream.

What I claim and desire to secure by Letters Patent of the United States is:

1. The method of tempering a fluid stream to be supplied to a chamber which comprises feeding a stream of fluid to be tempered into a space having communication with the chamber, simultaneously feeding a second stream of fluid of higher sensible heat into the space, discharging the streams from the space into the chamber, and passing the streams through a perforate obstruction subsequent to their entrance into the space whereby to create turbulent flow of the streams within the space effectively to blend the streams prior to discharge thereof into the chamber.

2. The method of modifying the atmosphere within a room or enclosure which comprises supplying air to a plurality of rotary impelling means, rotating one of said means at a predetermined peripheral speed whereby the air handled by the means has a relatively high pressure head, rotating another of the impelling means at a lower predetermined peripheral speed whereby to produce a lower pressure head, dehumidifying the air supplied to the first impelling means whereby the air handled by the first impelling means has a different temperature and relative humidity from that of the air handled by the second impelling means, supplying the air from the first and second impelling means to the room or enclosure, and passing the air from the first and second impelling means through a perforated obstruction for mixing the air from the first and second impelling means adjacent but prior to discharge of the air into the room or enclosure.

3. The method of cooling and ventilating an enclosure which comprises cooling and dehumidifying a stream of air, delivering this air to the interior of the enclosure, delivering a second stream of relatively warmer air to the enclosure in surrounding or enveloping relation to the discharge of the first-named stream, and regulating the volume per unit of time of cooled and dehumidified air in accordance with the wet-bulb temperature within the enclosure in the region of the discharging streams whereby to maintain a substantially constant relative humidity of the enclosure atmosphere in the regions of the discharging streams.

THOMAS CHESTER.